United States Patent
Shirasawa

(10) Patent No.: US 6,250,179 B1
(45) Date of Patent: Jun. 26, 2001

(54) SILK HAT FLEXIBLE ENGAGEMENT GEAR DEVICE

(75) Inventor: Naomi Shirasawa, Nagano-ken (JP)

(73) Assignee: Harmonic Drive Systems, Inc. (JP)

(*) Notice: Subject to any disclaimer, the term of this patent is extended or adjusted under 35 U.S.C. 154(b) by 0 days.

(21) Appl. No.: 09/319,980
(22) PCT Filed: Oct. 16, 1997
(86) PCT No.: PCT/JP97/03751
§ 371 Date: Aug. 4, 1999
§ 102(e) Date: Aug. 4, 1999
(87) PCT Pub. No.: WO99/20917
PCT Pub. Date: Apr. 29, 1999

(51) Int. Cl.[7] ................................................. F16H 1/32
(52) U.S. Cl. ............................................................ 74/640
(58) Field of Search .............................. 74/640; 475/162

(56) References Cited

U.S. PATENT DOCUMENTS

| | | | |
|---|---|---|---|
| 4,598,947 | * 7/1986 | Foiurrey et al. | 74/640 X |
| 4,825,720 | * 5/1989 | Capdepuy | 74/640 |
| 5,715,732 | * 2/1998 | Takizawa et al. | 74/640 |
| 5,775,178 | * 7/1998 | Asawa et al. | 74/640 |
| 5,850,765 | * 12/1998 | Shirasawa | 74/640 |
| 5,906,142 | * 5/1999 | Shirasawa | 74/640 |
| 5,984,048 | * 11/1999 | Kiyosawa et al. | 74/640 X |

FOREIGN PATENT DOCUMENTS

| | | |
|---|---|---|
| 8-166051 | 6/1996 | (JP). |
| 8-166052 | 6/1996 | (JP). |
| 9-250608 | 9/1997 | (JP). |
| 9-250611 | 9/1997 | (JP). |

* cited by examiner

Primary Examiner—Charles A Marmor
Assistant Examiner—Ankur Parekh
(74) Attorney, Agent, or Firm—Burns, Doane, Swecker & Mathis, L.L.P.

(57) ABSTRACT

A silk hat flexible engagement gear device (1) has first and second end plates (2, 3) and an input shaft (4) is rotatably supported, with their ends supported, between the tow end plates. An annular body (61) of a silk hat flexible external gear (6) is disposed on the outer circumference of the input shaft (4). A cross roller bearing (8) and a rigid internal gear (5) which also function as a device housing are arranged on the outer circumference. An cylindrical boss (64) of the flexible external gear is held between the outer race (81) of the cross roller bearing and the second end plate (3) and these three members are coupled with one another by means of second fixing bolts (11). An additional member which is used as a device housing is not necessary. The members are temporarily fixed and fastened and, further, attached to a housing on the motor side or on the load side by the fixing bolts (9, 11). Therefore, the number of components of the device can be reduced, whereby making the device small and compact.

7 Claims, 2 Drawing Sheets

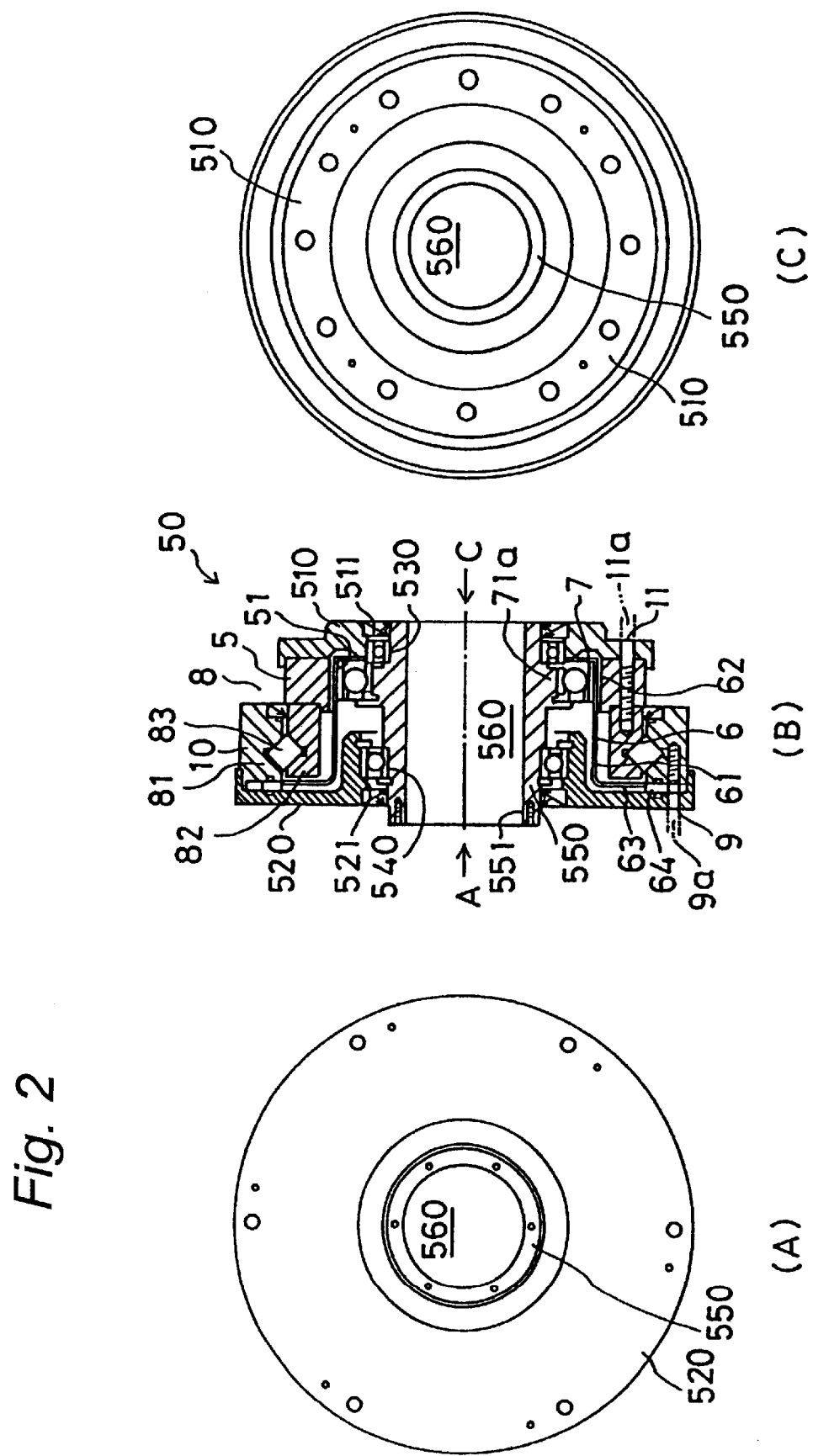

SILK HAT FLEXIBLE ENGAGEMENT GEAR DEVICE

TECHNICAL FIELD

This invention relates to a silk hat flexible engagement gear device which can be manufactured small and compactly, and at the same time cheaply with using a small number of component parts.

BACKGROUND ART

As the flexible engagement gear device, such types are known whose component part, flexible external gear is of a circular shape, a cup shape, and a silk hat shape. Among these types of flexible engagement gear devices, the applicant of this application has proposed a flexible engagement gear device having a flat silk-hat flexible external gear in JP-A 8-166051 and JP-A 8-166052. Using a flat silk-hat flexible external gear makes it possible to constitute a flexible engagement gear device flat.

DISCLOSURE OF INVENTION

An object of this invention is directed to further reduction in number of component parts and in manufacturing cost of a flexible engagement gear device which is provided with a silk-hat shaped flexible external gear.

In order to achieve the above object, the following constitution is employed for a flexible engagement gear device which comprises a circular rigid internal gear, a silk-hat shaped flexible external gear, and a wave generator, wherein the flexible external gear has an annular body, external teeth formed on a outer circumferential surface of an open end of the body, a cylindrical diaphragm extending radially and outwardly from an open end at an opposite side of the body, and a thick boss connected integrally to an outer circumferential end of the diaphragm, wherein the body of the flexible external gear is disposed inside the rigid internal gear so that the external teeth face internal teeth of the rigid internal gear, and wherein the wave generator is fixed inside the body where the external teeth are formed and flexes the annular body in a radial direction, to thereby engage the external teeth partially with the internal teeth and to shift engagement portions in a circumferential direction.

Namely, the flexible engagement gear device has a first end plate and a second end plate disposed at both sides along a device axial direction, between which the rigid internal gear, flexible external gear and wave generator are arranged. Further, an input shaft is arranged to pass through and is fixedly connected to the wave generator. The input shaft is rotatably supported at one end by the first end plate and at the other end by the second end plate. Furthermore, a bearing for supporting the rigid internal gear and the flexible external gear to allow relative rotation thereof is disposed in a manner that it encloses the body of the flexible external gear at a position adjacent to the rigid internal gear. In addition, with the rigid internal gear being held between an inner race of the bearing and the first end plate, these three members are put together along the device axial direction, and the first end plate and the rigid internal gear are coupled together with the side of the inner race by means of a plurality of first fixing bolts attached from the side of the first end plate. Likewise, an outer race of the bearing, the circular boss and the second end plate are put together along the device axial direction so that the circular boss is held between the outer race of the bearing and the second end plate, and the second end plate and the circular boss are coupled together with the side of the outer race by means of a plurality of second fixing bolts attached from the side of the second end plate.

It is preferable to use a cross roller bearing as the above-mentioned bearing which is capable of supporting thrust load.

The input shaft may be a hollow input shaft arranged to have the both ends thereof pass through the first and second end plates. With is, a hollow portion of the hollow input shaft can be used for wiring and the like, and a rotational drive source such as a motor can be arranged at either sides of the first and second end plates, increasing flexibility of device layout.

Moreover, the rigid internal gear and the inner race may be made as a single component part, which is preferable that the number of component parts can be reduced and that misalignment of these parts can be prevented. Similar effects can also be obtained where the first end plate and the inner race are made as a single component part. In particular, such effects can be enhanced where the rigid internal gear, the inner race and the first end plate are made as a single component part.

According to the silk hat flexible engagement gear device as constituted above, both ends thereof is defined by the first and second and plates, the flexible external gear, rigid internal gear and wave generator are disposed between the first and second end plates, a bearing is disposed on an outer circumference of the flexible external gear, the inner and outer races of the bearing are fixed on the first and second end plates, respectively, and the input shaft for rotating the wave generator is rotatably supported at its both ends by the first and second end plates. Therefore, the bearing and the rigid internal gear are arranged adjacent to each other between the first and second end plates, which serve as a device housing. Hence, an additional member is not required to arrange as a device housing.

Further, in order to shorten the axial length of the silk hat engagement flexible gear device of this invention, the axial length of the annular body of the flexible external gear having a silk-hat shape must be shortened. With using the flat-type, silk-hat shaped flexible external gear aforementioned and proposed by the applicant of this application, flattening of the device can easily be obtained.

Furthermore, in the silk hat flexible engagement gear device according to this invention, the first end plate, the flexible external gear and the outer race of the bearing can easily be coupled with one another simply by placing the thick cylindrical boss formed on the outer circumferential edge of the diaphragm of the flexible external gear between the first end plate and the outer face of the bearing. Similarly, the rigid internal gear, the inner race of the bearing and the first end plate can easily be coupled with one another simply by placing the rigid internal gear between the inner race of the bearing and the first end plate.

Furthermore, the projecting direction of the input shaft, in other words, the mounting side of the motor can be changed only by replacing the first and second end plates at both ends without changing shapes or the like of the rigid internal gear, flexible external gear or wave generator, these parts being main constituent parts of the wave gear device.

Especially, in the silk hat flexible engagement gear device of this invention, the first end plate and the rigid internal gear are coupled with each other with the first fixing bolts. Conventionally, these three members are temporarily fastened by temporarily-fastening bolts and then are fastened by fastening bolts. In this invention, the first fixing bolts corresponding to the temporarily fastening bolts are used to couple these members with one another. Thus, only either one of the temporarily-fastening bolts or the fastening bolts are required. As a result, only one group of bolt-holes are required to form instead of two groups of bolt-holes for the temporarily-fastening bolts and the fastening bolts. According to the silk hat flexible engagement gear device of this invention, the number of component parts of the device can be reduced, and assembly of the parts thereof can be made easily, whereby reducing the manufacturing cost.

The above-mentioned functions and effects are also applied where three members (the second end plate, the circular boss of the flexible external gear and the outer race of the bearing) are coupled with one another by means of the second fixing bolts.

BRIEF DESCRIPTION OF THE DRAWINGS

FIG. 2 shows a silk hat flexible engagement gear device of a second example according to this invention, wherein (A) is a side view thereof viewed from the side indicated by an arrow A, (B) is a longitudinal sectional view thereof cut along a device axial line, and (C) is a side view thereof viewed from the side indicated by an arrow C.

BEST MODE FOR CARRYING OUT THE INVENTION

Figure 1:
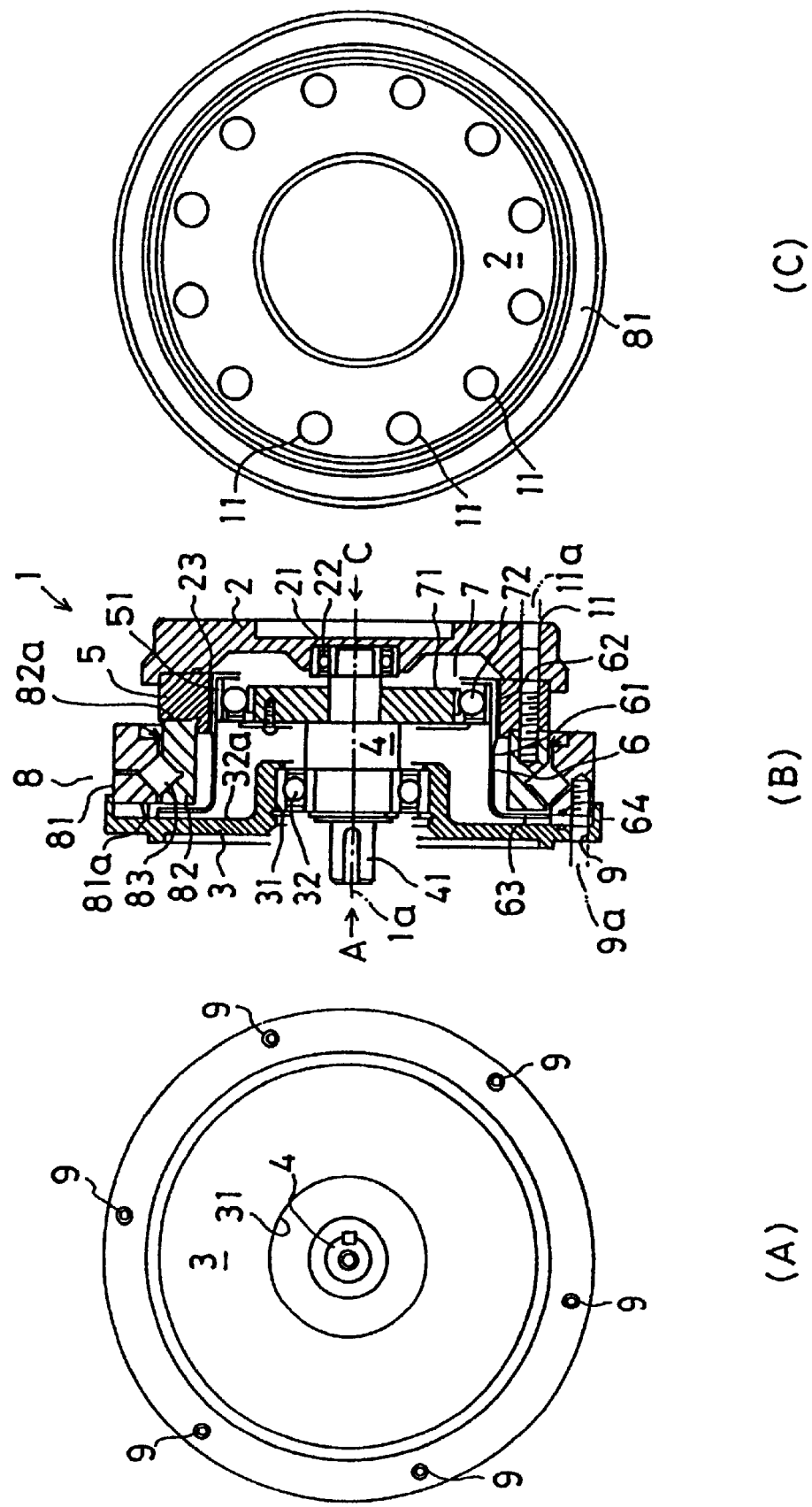
FIG. 1 shows a silk hat flexible engagement gear device of a first example according to this invention, wherein (A) is a side view thereof viewed from the side indicated by an arrow A, (B) is a longitudinal sectional view thereof cut along a device axial line, and (C) is a side view thereof viewed from the side indicated by an arrow C.

Referring now to the drawings, a silk hat flexible engagement gear device according to this invention will be described.

(First example)

FIGS. 1(A) to 1(C) show a first example of a silk hat flexible engagement gear device according to this invention.

The flexible engagement gear device 1 of this example has both ends along a direction of an axial line 1a which are defined by first and second end plates 2 and 3. The first end plate 2 has an inner-side end surface formed at its center with a circular recess 21. An input shaft 4 is arranged along the device axial line 1a and is rotatably supported at one end by an inner circumferential surface of the circular recess 21 via a bearing 22. The second end plate 3 is also formed at its center with a through hole 31. The other end of the input shaft 4 is rotatably supported by an inner circumferential surface of the through hole 31 via a bearing 32. A tip end 41 of the input shaft 4 projects outward from the through hole 31.

Next, there is assembled a flexible engagement gear mechanism between the both end plates 2 and 3. The flexible engagement gear mechanism comprises a circular rigid internal gear 5, a silk-hat shaped flexible external gear 6, and a wave generator 7. The flexible external gear 6 has an annular body 61, external teeth 62 formed on an outer circumferential portion of an open end at one side of the body, a circular diaphragm 63 which is continued to the other open end of the body and extends radially and outwardly in a direction perpendicular to the body open end. The rigid internal gear 5 is disposed on the circumference of the external teeth 62 and is formed on its inner circumferential surface with internal teeth which are engageable with the external teeth 62. The wave generator 7 is fixed inside the body 61 where the external teeth 62 are formed.

The wave generator 7, in this example, is constituted by a rigid cam plate 71 having an elliptical profile and a wave bearing 72 fixed on the outer circumferential surface of the cam plate. The input shaft 4 extends passing through the center portion of the rigid cam plate 71 and is fixedly connected thereto. The input shaft 4 is also connected to a rotational drive source such as a motor (not shown).

With the wave generator 7, the flexible external gear 6 is flexed into an elliptical shape at its portion of the external teeth 62 to engage with the inner teeth 51 on both ends along the major axis of the elliptical shape. As the input shaft 4 rotates, the wave generator 7 is also rotated, whereby the engaging portions of the external and internal teeth 62, 51 are moved circumferentially. Typically, the number of teeth of the external teeth 62 is two less than that of the internal teeth 51, so that as the engaging portions are moved circumferentially, relative rotation of a greatly reduced speed compared to input rotation is produced between the external and internal gears. This relative rotation can be derived from the internal or external gear. Since this reduction mechanism is well known, detailed explanation thereof is omitted in this specification.

Next, at the outer circumferential side of the body 61 of the flexible external gear 6, a cross roller bearing 8 is disposed between the second end plate 3 and the rigid internal gear 5. The cross roller bearing 8 has an outer race 81, an inner race 82, and a plurality of rollers 83 which are arranged crossing one by one between the inner and outer recess in a manner that they are able to roll.

In this example, between a cylindrical end surface 61a of the outer race 61 of the cross roller bearing 6 and an inner-side end surface 32a of the second end plate 3 facing to the surface 61a, the cylindrical boss 64 of the flexible external gear 6 is disposed in a manner sandwiched by these members from both sides thereof. There three members are respectively formed with a plurality of second fixing bolt-holes 9 circumferentially. The second end plate 3 and the cylindrical boss 64 of the flexible external gear 6 are coupled together with the outer race 81 of the cross roller bearing 8 with second fixing bolts 9a inserted into the bolt-holes 9. In addition, the device 1 of this example is fixedly mounted on a housing of a rotational source such as a motor (not shown) by means of there second fixing bolts 9a.

On the other hand, between a cylindrical end surface 82a of the inner race 82 of the cross roller bearing 8 and a cylindrical end surface 23 of the first end plate 2 facing to the surface 82a, the rigid internal gear 5 is disposed in a manner sandwiched by these members from both sides thereof. There three members are respectively formed with first fixing bolt-holes 11. With first fixing bolts 11a inserted into these bolt-holes 11, the first end plate 2 and the rigid internal gear 5 are coupled together with the inner race 82 of the cross roller bearing 8. The device 1 of this example is also fixedly mounted on a housing of the load side (not shown) by means of the first fixing bolts 11a.

As explained above, in the silk hat flexible engagement gear device 1 of this example, the input shaft is rotatably supported at its both ends between the first and second and plates 2 and 3. In addition, the rigid internal gear and the cross roller bearing are arranged adjacent to each other between the first and second end plates 2, 3. Therefore, the outer race of the cross roller bearing and the rigid internal gear function as a device housing. Thus, an additional member is not required to arrange for the device housing. Further, the distance between the both end plates, that is, the axial length of the device depends on the axial length of the silk-hat shaped flexible external gear which is disposed between the end plates. Hence, an extremely flat silk hat flexible engagement gear device can be realized by adopting the short-body type flexible external gear which has been proposed by the applicant of this application as mentioned above.

Furthermore, the projecting direction of the input shaft, or the mounting side of the motor can be changed only by replacing the first and second end plates without change in shape or the like of the rigid internal gear, the flexible external gear or the wave generator, which are main components of the wave gear device. Moreover, a hollow-type device can easily be realized by employing a hollow shaft as the input shaft to pass through the end plates.

It is noted in the silk hat flexible engagement gear device 1 of this example that the cylindrical boss 64 of the flexible external gear 6 and the second end plates 3 are coupled together with the outer race 81 by means of the second fixing bolts 9a. The device 1 of this example is also fixedly mounted on a housing of a motor (not shown) with the second fixing bolts 9a. Likewise, the rigid internal gear 5 and the first end plate 2 are coupled together with the inner race 82 by means of the first fixing bolts 11a, and the device 1 is fixedly mounted on a housing of the load side by the same.

As mentioned above, according to this example, it is constituted such that the three members are coupled with one another, and the device is fixedly mounted on the housings of the motor and the load sides by using the same bolts. Therefore, both temporarily-fixing bolt-holes and fastening bolt-holes are not required to form, but only one group of bolt-holes may be formed. Further, since the number and kind of bolts are reduced, whereby steps for assembling operation are also reduced.

(Second example)

FIG. 2 shows a second example of a silk hat flexible engagement gear device according to this invention. The flexible engagement gear device 50 of this example has the basic structure which is the same as that of the silk hat flexible engagement gear device shown in FIG. 1, and therefore elements corresponding to those in FIG. 1 are denoted by the same reference numerals and explanation thereof is omitted.

The flexible engagement gear device 50 of this example is characterized by making an input shaft to be a hollow one to form a hollow-type flexible engagement gear device. For that purpose, first and second end plates 510 and 520 of this example are made to be cylindrical plates which are formed with center holes having substantially the same size, and a hollow input shaft 550 passes through and is rotatably supported by these plates.

More specifically, the hollow input shaft 550 is rotatably supported via bearings 530 and 540 by inner circumferential surfaces of the end plates 510 and 520. The hollow input shaft 550 has an end 551 slightly projecting from the end plate 520 for connection to an output shaft of a drive motor (not shown). In this example, a wave generator 7 as one of the components of the flexible engagement gear mechanism has a rigid cam plate 71a which is formed integrally on the input shaft 550. The remaining parts are the same as those in the first example.

According to the thus constituted silk hat flexible engagement gear device 50, similar functions and effects as those of the aforementioned flexible engagement gear device 1 can also be obtained. In addition to this, since the through-hole 560 is formed at the center of the device, another members, a variety of wires or the like can be arranged making use of the though-hole.

INDUSTRIAL APPLICABILITY

As explained above, according to the silk hat flexible engagement gear device of this invention, the input shaft is bridged between the first and second end plates with both ends of the shaft supported, and the bearing and the rigid internal gear are arranged adjacent to each other between these plates. Thus, the outer race of the bearing and the rigid internal gear function as a device housing, eliminating an additional member to assemble for the device housing.

Further, where the silk-hat shaped flexible external gear is made flat, a small and compact device having a short axial length can be realized.

Furthermore, the drive motor can be assembled at either sides of the device only by changing the shape of the first and second end plates or replacing the attachment sides of these end plates, without changing layout and the like of the rigid internal gear, flexible external gear and/or wave generator constituting the flexible engagement gear mechanism.

Moreover, according to the silk hat flexible engagement gear device of this invention, when mounted on the housing of a motor or the like, the component parts of the device including the rigid internal gear and flexible external gear are the same time coupled with one another. Therefore, assembling operation thereof can be simplified, and the number of component parts thereof are also reduced.

In addition, since the silk-hat shaped flexible external gear is used, torsional strength of the diaphragm portion can be enhanced, and therefore the rigidity of the device can also be enhanced in comparison with the case where a cup-shaped flexible external gear is used.

Especially, in the silk hat flexible engagement gear device according to this invention, the cylindrical boss of the flexible external gear and the second end plates are coupled together with the outer race of the bearing by means of the second fixing bolts, and at the same time the device is assembled to the housing of a motor (not shown) by the same second fixing bolts. Similarly, the rigid internal gear and the first end plate are coupled together with the inner race of the bearing, and the bearing is connected to the load side by the same first fixing bolts.

Accordingly, with the same bolts, the three members are fastened together, and at the same time the device is connected to the motor side or the load side. Thus, different from the prior art, both the temporarily-fixing bolt-holes and the fastening bolt-holes are not required to form, but only one group of bolt-holes may be formed. In addition, the number and kind of bolts can be reduced, whereby steps of assembling operation can also be reduced, which is advantageous.

What is claimed is:

1. A silk hat flexible engagement gear device comprising a circular rigid internal gear, a silk-hat shaped flexible external gear, and a wave generator, wherein:

the flexible external gear has an annular body, external teeth formed on an outer circumferential surface of an open end of the body, a cylindrical diaphragm extending radially and outwardly from an open end at an opposite side of the body, and a boss connected integrally to an outer circumferential end of the diaphragm;

the body of the flexible external gear is disposed inside the rigid internal gear so that the external teeth face internal teeth of the rigid internal gear;

the wave generator is fixed inside the body where the external teeth are formed and flexes the annular body in a radial direction, to thereby engage the external teeth partially with the internal teeth and to shift engagement portions in a circumferential direction;

a first end plate and a second end plate are disposed at both sides along a device axial direction, between which the rigid internal gear, flexible external gear and wave generator are arranged;

an input shaft is arranged to pass through the wave generator and is fixedly connected thereto;

the input shaft is rotatably supported at one end by the first end plate and at the other end by the second end plate;

a bearing for supporting the rigid internal gear and the flexible external gear to allow relative rotation thereof is disposed in a manner that it enclosed the body of the flexible external gear at a position adjacent to the rigid internal gear;

an inner race of the bearing, the rigid internal gear and the first end plate are put together along the device axial line so that the rigid internal gear is held between the inner race of the bearing and the first end plate;

the first end plate and the rigid internal gear are coupled together with the inner race by means of a plurality of first fixing bolts attached from the side of the first end plate;

an outer race of the bearing, the boss and the second end plate are put together along the device axial line so that the boss is held between the outer race of the bearing and the second end plate; and the second end plate and the boss are coupled together with the outer race by means of a plurality of second fixing bolts attached from the side of the second end plate.

2. The silk hat flexible engagement gear device according to claim 1, wherein the bearing is a cross roller bearing.

3. The silk hat flexible engagement gear device according to claim 1, wherein the input shaft is a hollow input shaft.

4. The silk hat flexible engagement gear device according to claim 1, wherein the rigid internal gear and the inner race are formed as a single component part.

5. The silk hat flexible engagement gear device according to claim 1, wherein the inner race and the first end plate are formed as a single component part.

6. The silk hat flexible engagement gear drive according to claim 1, wherein the boss has a greater thickness than the diaphragm.

7. The silk hat flexible engagement gear device according to claim 1, wherein the boss is cylindrical.

* * * * *